(12) United States Patent
Liu et al.

(10) Patent No.: US 7,808,200 B2
(45) Date of Patent: Oct. 5, 2010

(54) MOTOR CONTROLLER WITH HALL SENSOR MISALIGNMENT COMPENSATION

(75) Inventors: Raymond Y. Liu, Monterey Park, CA (US); Estella C. Chung, West Hills, CA (US); William K. Morita, Jr., West Hills, CA (US)

(73) Assignee: Woodward HRT, Inc., Santa Clara, CA (US)

( * ) Notice: Subject to any disclaimer, the term of this patent is extended or adjusted under 35 U.S.C. 154(b) by 497 days.

(21) Appl. No.: 11/850,999

(22) Filed: Sep. 6, 2007

(65) Prior Publication Data

US 2009/0066274 A1    Mar. 12, 2009

(51) Int. Cl.
*H02P 3/18* (2006.01)

(52) U.S. Cl. .............. 318/700; 318/400.21; 318/400.38; 318/434; 318/437

(58) Field of Classification Search .................. 318/127, 318/280, 400.01, 400.1, 400.13, 400.14, 318/400.15, 400.23, 400.42, 689, 700, 799, 318/432, 437, 445, 400.21, 560, 696, 430, 318/434
See application file for complete search history.

(56) References Cited

U.S. PATENT DOCUMENTS

| | | | | |
|---|---|---|---|---|
| 4,782,272 | A * | 11/1988 | Buckley et al. | 318/400.01 |
| 4,818,908 | A * | 4/1989 | Tamae et al. | 310/171 |
| 5,164,622 | A | 11/1992 | Kordik | |
| 5,483,135 | A * | 1/1996 | Parks | 318/469 |
| 5,497,326 | A * | 3/1996 | Berland et al. | 701/36 |
| 6,051,943 | A * | 4/2000 | Rabin et al. | 318/400.09 |
| 6,239,564 | B1 * | 5/2001 | Boe et al. | 318/400.21 |
| 6,271,641 | B1 * | 8/2001 | Yasohara et al. | 318/685 |
| 6,338,016 | B1 * | 1/2002 | Miller et al. | 701/43 |
| 6,548,979 | B2 * | 4/2003 | Boisvert et al. | 318/469 |
| 6,826,499 | B2 | 11/2004 | Colosky et al. | |
| 6,891,343 | B2 | 5/2005 | Petersen | |

(Continued)

FOREIGN PATENT DOCUMENTS

DE    3424247 A1    1/1986

OTHER PUBLICATIONS

Yedamale, Padmaraja; Microchip Technology, Inc., "Brushless DC (BLDC) Motor Fundamentals", Microchip AN885, 2003.

*Primary Examiner*—Walter Benson
*Assistant Examiner*—Antony M Paul
(74) *Attorney, Agent, or Firm*—BainwoodHuang

(57) ABSTRACT

A technique can recover from motor stalls caused by misalignment of motor position sensors such as Hall-effect sensors. In a normal operating mode, a motor controller provides motor drive current to the motor windings based on the sensor signals according to a normal commutation sequence, and monitors for occurrence of a motor stall condition. Upon detecting the motor stall condition, the motor controller first momentarily drives the windings according to one of an advanced commutation state and a delayed commutation state each adjacent to the given commutation state in the normal commutation sequence, and determines whether the motor stall condition persists. If the stall condition persists, then the motor controller next momentarily drives the windings according to the other of the advanced commutation state and the delayed commutation state. By this action, the controller attempts operation at both preceding and succeeding portions of the torque characteristic, such that operation with increased torque is ensured even though the direction of the sensor misalignment is unknown.

12 Claims, 4 Drawing Sheets

U.S. PATENT DOCUMENTS

| | | |
|---|---|---|
| 6,995,679 B2 | 2/2006 | Eskritt et al. |
| 7,026,773 B2 * | 4/2006 | Petersen ................ 318/400.01 |
| 7,208,906 B2 * | 4/2007 | Turner et al. ............ 318/254.1 |
| 7,259,531 B1 * | 8/2007 | Liu ....................... 318/400.38 |
| 7,495,409 B2 * | 2/2009 | Coutu ....................... 318/685 |
| 2003/0034751 A1 | 2/2003 | Walters |
| 2005/0275361 A1 | 12/2005 | Bolt |

\* cited by examiner

MOTOR CONTROLLER WITH HALL SENSOR MISALIGNMENT COMPENSATION

BACKGROUND

In so-called brushless direct-current (BLDC) motors, motor rotation is caused by electronic switching or "commutation" of drive current among a plurality of motor windings. The commutation induces a rotating component to the overall magnetic field associated with the windings, and the interaction of this rotating magnetic field component with the rotor's permanent magnets which causes rotation of the rotor. In one example, one common BLDC configuration employs three windings offset from each other by 120 degrees of electrical phase.

Commutation can be performed in many different ways. In one common arrangement, a set of motor position sensors such as Hall-effect magnetic sensors are arranged about the motor rotational axis with a precise spacing. As the rotor rotates, the output of each Hall-effect sensor switches in a binary fashion. The collective outputs of the sensors are used to control commutation. In one simple arrangement, three sensors offset from each other by nominally 120 mechanical degrees are used. Each of six distinct sets of the three binary outputs of the sensors maps directly to a corresponding commutation state in which a particular pair of the motor windings is driven with current with a particular polarity. Thus commutation occurs precisely at the time that the binary output from one of the sensors switches from one binary state to the other. Ideally, the sensors are located such that this transition occurs exactly midway between two successive peaks of a torque characteristic of the motor, so that the value of the torque at this "valley" location is as high as possible. This ideal configuration provides the highest minimum torque value which may be especially needed to maintain proper operation under high load conditions.

U.S. Pat. No. 6,239,564 of Boe et al. discloses a motor controller that senses an impending motor stall accompanied by magnetic saturation of the energized windings and advances the commutation state to the next succeeding state in advance of the corresponding transition of the Hall-effect sensors. Boe et al. describe this operation as increasing the torque to the motor to enable it to stay out of the stall condition.

SUMMARY

Misalignment of the motor position sensors in a motor system can cause commutation to be later or earlier than the ideal, causing the torque to be reduced below the ideal minimum torque that is available with perfect alignment. Under high load conditions, the motor could stall. It is desirable to quickly detect and overcome such a stall, i.e., resume normal motor rotation, if possible.

The technique of Boe et al. is applied to the case of an impending stall with accompanying saturation, which is overcome by switching to the next successive commutation state. This technique cannot be used to address sensor misalignment which erroneously shifts commutation in an unknown direction (either early or late). If the sensors are misaligned such that commutation occurs earlier than under ideal conditions, then merely switching to the next successive commutation state as in Boe et al. will not result in the desired increased torque, but rather an even further diminished torque that will likely not overcome the stall.

The disclosed technique is directed to recovering from stalls caused by the misalignment of motor position sensors (such as Hall-effect sensors) where the direction of such misalignment is not known a priori. In a normal operating mode, a disclosed motor controller (1) provides motor drive current to the windings of a motor based on the sensor signals such that sets of the windings are driven in a normal commutation sequence corresponding to a sequence of states of the sensor signals, and (2) monitors for occurrence of a motor stall condition. Upon detecting the motor stall condition with the sensor signals in a given state that in the normal operating mode results in driving the windings according to a corresponding given commutation state, the motor controller (1) in a first driving step, momentarily drives the windings according to one of an advanced commutation state and a delayed commutation state each adjacent to the given commutation state in the normal commutation sequence, (2) determines whether the motor stall condition persists after the first driving step, and (3) if the stall condition persists after the first driving step then in a second driving step momentarily drives the windings according to the other of the advanced commutation state and the delayed commutation state. By this action, the controller attempts operation at both preceding and succeeding portions of the torque characteristic, one of which is the more effective portion for increasing torque depending on the direction of misalignment of the sensors. Thus operation with increased torque is ensured even though the direction of the sensor misalignment is unknown.

BRIEF DESCRIPTION OF THE DRAWINGS

The foregoing and other features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
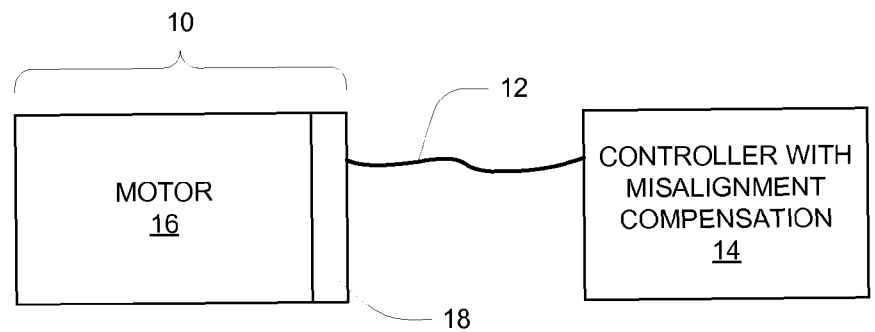
FIG. 1 is a block diagram of a motor system according to one embodiment.

FIG. 1 shows a system having a motor assembly 10 coupled by a wiring harness 12 to a controller 14. The motor assembly 10 includes a motor 16 such as a brushless DC motor, and a sensor assembly 18 affixed to one end of the motor 16. One end of the wiring harness 12 terminates on the sensor assembly 18.

The controller 14 controls the operation of the motor 10, specifically its rotational position and/or speed depending on the application. In one application, the motor 16 is part of an electromagnetic actuator utilized to control the position of a mechanical component, such as in an aircraft. The controller 14 monitors the rotational position of the motor 14 via Hall-effect sensors located on the sensor assembly 18 and controls the flow of current to the windings of the motor 16 to achieve a desired motor position and/or speed for a desired actuator movement. Different types of motor control arrangements and techniques may be utilized in different embodiments, including specific circuitry for controlling winding currents. The present description is primarily concerned with recovering from a motor stall condition that is caused in part by inaccurate motor position information in turn caused by misalignment of the position sensors on the sensor assembly 18.

Figure 2:
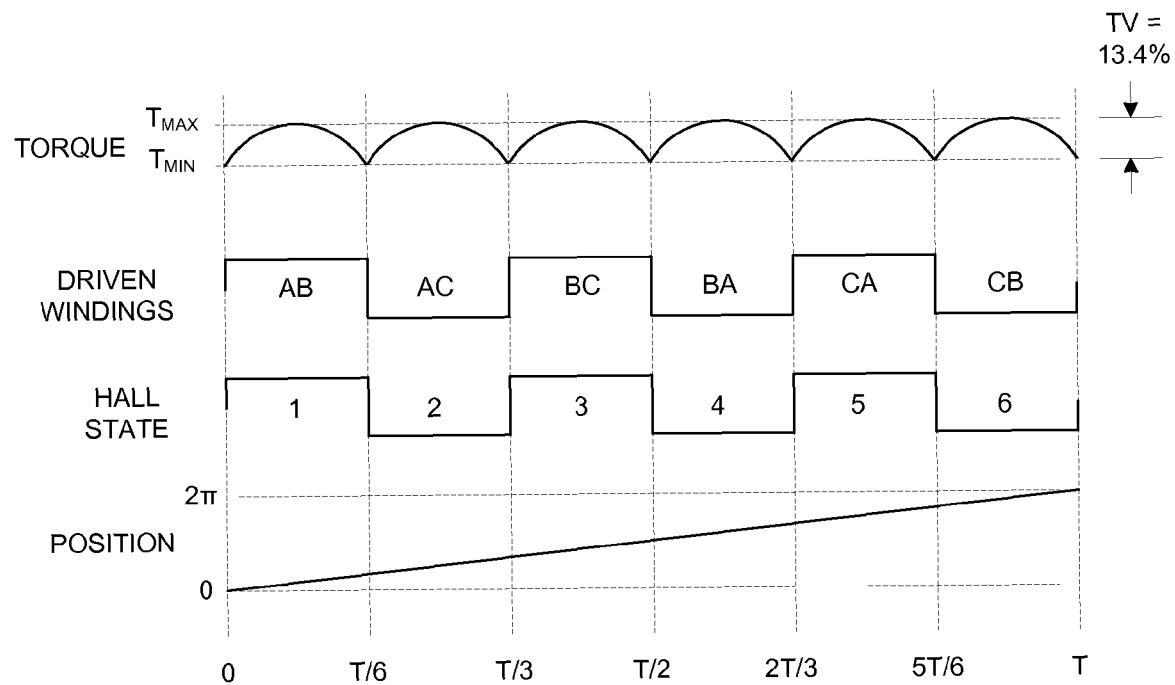
FIG. 2 is a waveform diagram depicting a normal operating mode of the motor system.

FIG. 2 depicts operation of the motor 16 under normal operating conditions. One electrical rotation from 0 to $2\pi$ radians is shown. The number of electrical rotations per mechanical rotation is dependent on the number of permanent magnet pole pairs in a particular motor design. The motor is assumed to have three rotor phase windings labeled A, B and C. The windings are driven pair-wise in operation through 6 commutation states or commutation intervals during each revolution as generally known in the art. The sequence of commutation states, also called a "commutation sequence", is shown as AB, AC, BC, BA, CA and CB in the illustrated embodiment. The timing of the commutation sequence is determined by the motor rotational position as indicated by the outputs of the Hall-effect sensors, which are indicated by the sequence of "Hall states" 1 through 6. Those skilled in the art will appreciate that the Hall states 1-6 may correspond to different combinations of binary states of three Hall-effect sensors arranged at intervals of $2\pi/3$ radians about the rotational axis, in one embodiment. Time in FIG. 2 is indicated by fractions of the motor rotation period T.

Also shown in FIG. 2 is a plot of the motor torque, which has the characteristic of a sum of rectified portions of the three phase voltages (back EMF). The torque exhibits ripple with a magnitude shown as a "torque valley" (TV) of 13.4%. This value represents the relative difference between the minimum torque value $T_{MIN}$ (trough at the commutation points between commutation intervals) and the maximum torque value $T_{MAX}$ (at the middle of each commutation interval). Thus if $T_{MAX}$ has a normalized value of 1 torque unit, for example, then the $T_{MIN}$ has a normalized value of 0.866 units.

In operation, the controller 14 utilizes the position information from the Hall-effect sensors in order to effect commutation of the motor windings to maintain motor rotation. When the motor 16 is in a range of positions corresponding to Hall state 1, for example (e.g. 0 to $\pi/3$ radians, electrical), then the controller 14 drives the winding pair AB. When the Hall-effect sensor signals transition to Hall state 2, the controller 14 switches or "commutates" the driving current to windings AC, etc. Thus in the normal operating mode, the driving of the motor windings is determined by the motor position information as indicated by the Hall-effect sensors.

Figure 3:
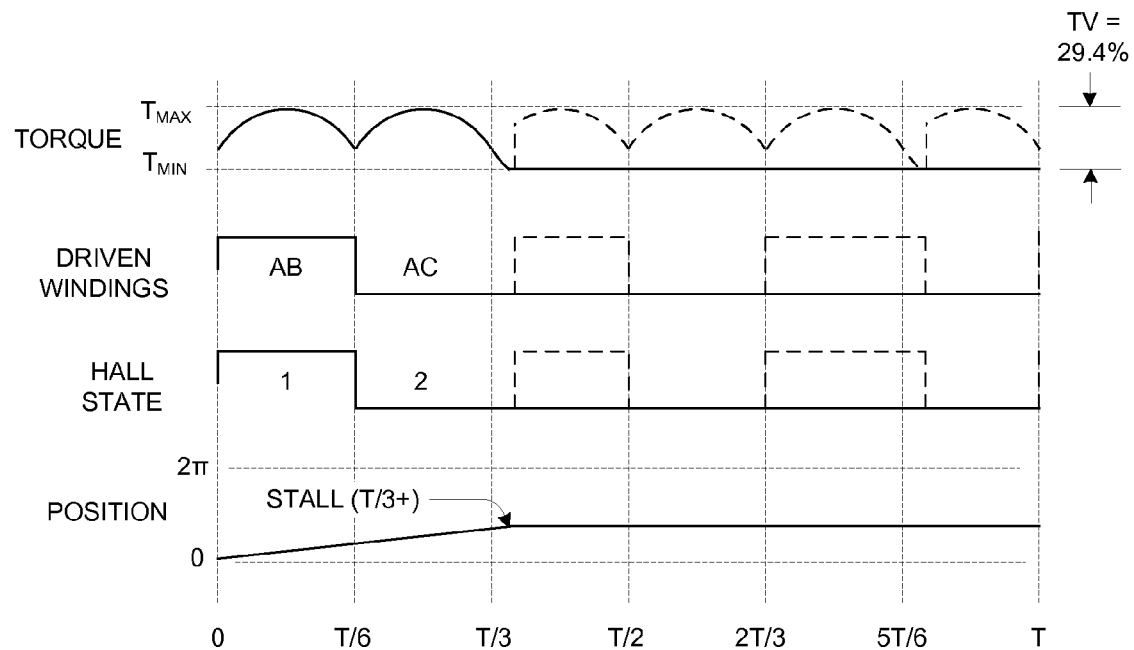
FIG. 3 is a waveform diagram depicting operation of the motor system when commutation is erroneously delayed by misalignment of motor position sensors.

FIG. 3 illustrates an undesirable operating condition that can occur when one of the Hall-effect sensors is misaligned such that its output exhibits a delay with respect to the output from a properly aligned sensor. The transitions into Hall states 1 and 2 exhibit normal timing, but the transition from state 2 to state 3 is delayed. Accordingly, the winding pair AC is driven beyond the normal commutation point at T/3, such that the motor torque is reduced below that ideal minimum shown in FIG. 3. In the illustrated example, the torque valley TV is about 29.4%, indicating that torque has fallen to about 70.6% of peak. In such a situation, if the motor load is sufficiently high then the motor can stall because it does not have sufficient torque to drive the load. Such a stall is shown in FIG. 3—it occurs at a time T/3+ just after the time T/3. Due to the stall, the Hall state remains at 2, and thus the controller 14 continues to drive winding pair AC and the torque remains at its low level. The dotted lines in FIG. 3 indicate the patterns of the respective signals that would be expected if the stall had not occurred.

Figure 4:
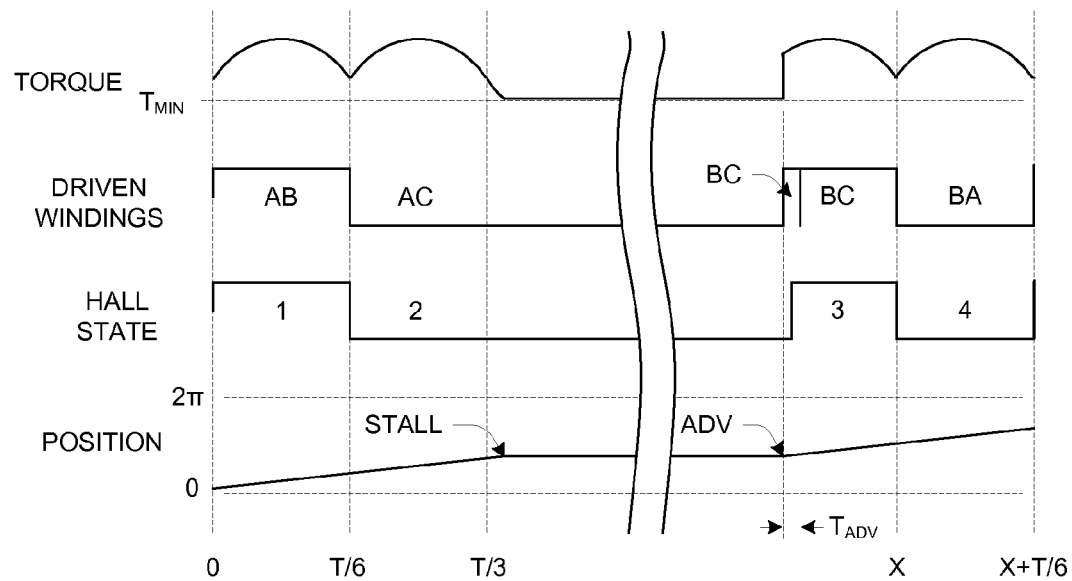
FIG. 4 is a waveform diagram depicting the operation of FIG. 3 followed by an operation of momentarily advancing commutation.

FIG. 4 illustrates a technique utilized to recover from a situation of the type shown in FIG. 3. It is assumed that the motor stall at time T/3+ is detected by some means, such as circuitry which detects that no movement of the motor has occurred for a period of time under conditions in which movement is expected (i.e., movement is being commanded by higher-level circuitry within the controller 14). Typically such a stall condition will be accompanied by application of an abnormally high driving current to the windings which can be detected within the controller 14. At the time that such a stall is detected, which is shown as "ADV" in FIG. 4, the controller 14 momentarily advances the commutation state of the windings. In the particular situation of FIG. 4, drive current is momentarily applied to the winding pair BC. As shown, this action moves the motor operation to a much higher point on the torque curve. If the torque increase is sufficient, the motor will begin rotating again and normal operation can resume, such as shown in FIG. 4. In this case, the Hall state will resume its normal sequencing starting with a transition to state 3 during the momentary advance of the commutation state, and the controller 14 resumes the normal pattern of driving the windings starting with the winding pair BC.

As indicated, the recovery illustrated in FIG. 4 involves momentarily driving the next winding pair of the normal commutation sequence. The duration of this operation is shown as $T_{ADV}$ in FIG. 4. The duration of $T_{ADV}$ will be highly dependent on a variety of factors, including the dynamic rotational characteristics of the motor 14 and the degree of misalignment of the Hall-effect sensors. In one application in which the motor is part of an electromechanical actuator for an aircraft, a value of $T_{ADV}$ in the range of 10-12 milliseconds may be effective.

Figure 5:
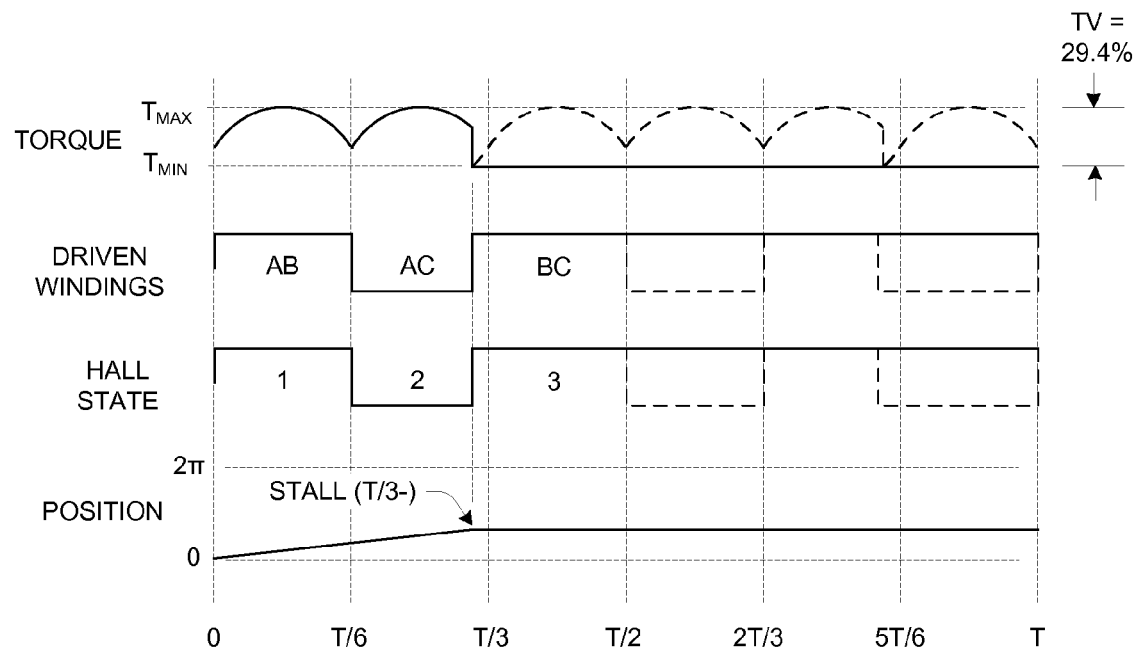
FIG. 5 is a waveform diagram depicting operation of the motor system when commutation is erroneously advanced by misalignment of motor position sensors.
Figure 6:
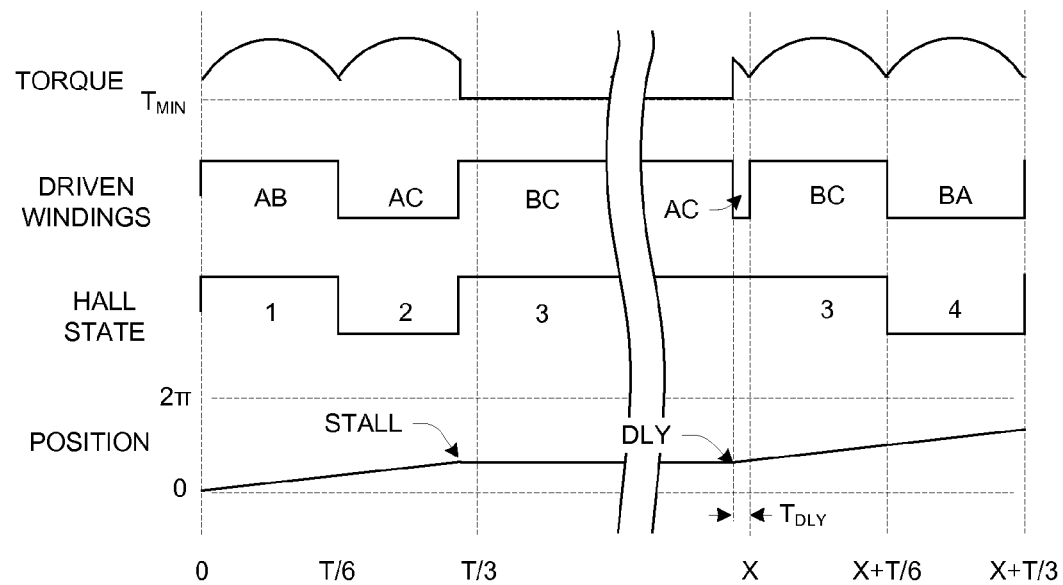
FIG. 6 is a waveform diagram depicting the operation of FIG. 5 followed by an operation of momentarily delaying commutation.

FIGS. 5 and 6 illustrate another undesirable operating condition that can occur when one of the Hall-effect sensors is misaligned such that its output exhibits an advance with respect to the output from a properly aligned sensor. The transitions into Hall states 1 and 2 exhibit normal timing, but the transition from state 2 to state 3 is advanced or early. Accordingly, the winding pair BC becomes driven prematurely, before the normal commutation point at T/3, such that the motor torque is abruptly reduced below the ideal minimum shown in FIG. 3. In the illustrated example, the torque valley TV is again about 29.4%. In such a situation, if the motor load is sufficiently high then the motor can stall because it does not have sufficient torque to drive the load. Such a stall is shown in FIG. 5—it occurs at a time T/3− just prior to T/3. Due to the stall, the Hall state remains at 3, and thus the controller 14 continues to drive winding pair BC and the torque remains at its low level. The dotted lines in FIG. 5 indicate the patterns of the respective signals that would be expected if the stall had not occurred.

FIG. 6 illustrates a technique utilized to recover from a situation of the type shown in FIG. 5. It is assumed that the motor stall at time T/3− is detected by some means such as discussed above. At the time that such a stall is detected, which is shown as "DLY" in FIG. 6, the controller 14 momentarily delays the commutation state of the windings, i.e., it momentarily drives the winding pair that precedes the currently driven winding pair in the commutation sequence. In the particular situation of FIG. 6, drive current is momentarily applied to the winding pair AC. As shown, this action moves the motor operation to a much higher point on the torque curve. If the torque increase is sufficient, the motor will begin rotating again and normal operation can resume, such as shown in FIG. 6. In this case, the Hall state will resume its normal sequencing beginning at Hall state 3 and the controller 14 resumes the normal pattern of driving the windings starting with the corresponding winding pair BC.

As indicated, the recovery illustrated in FIG. 6 involves momentarily driving the preceding winding pair of the normal commutation sequence. The duration of this operation is shown as $T_{DLY}$ in FIG. 6. The duration of $T_{DLY}$ will be highly dependent on a variety of factors, including the dynamic rotational characteristics of the motor 14 and the degree of misalignment of the Hall-effect sensors, and it may or may not be different from $T_{ADV}$. When a motor stall condition is detected, the controller 14 may not know whether the stall is caused by misalignment of the Hall-effect sensors, and if so whether the sensors are misaligned in one rotational direction so as to cause a late commutation (as shown in FIGS. 3 and 4) or in the other rotational direction so as to cause an early commutation (as shown in FIGS. 5 and 6). It will be appreciated by those skilled in the art that the advance technique of FIG. 4 will not recover from the stall condition of FIG. 5 caused by early commutation, and likewise the delay technique of FIG. 6 will not recover from the stall condition of FIG. 3 caused by late commutation. In either case, the torque applied during the momentary operation would actually be reduced rather than increased. Thus generally a motor system can only employ a single one of the techniques of FIG. 4 or 6 to overcome sensor misalignment if the direction of misalignment of the Hall-effect sensors is known.

Figure 7:
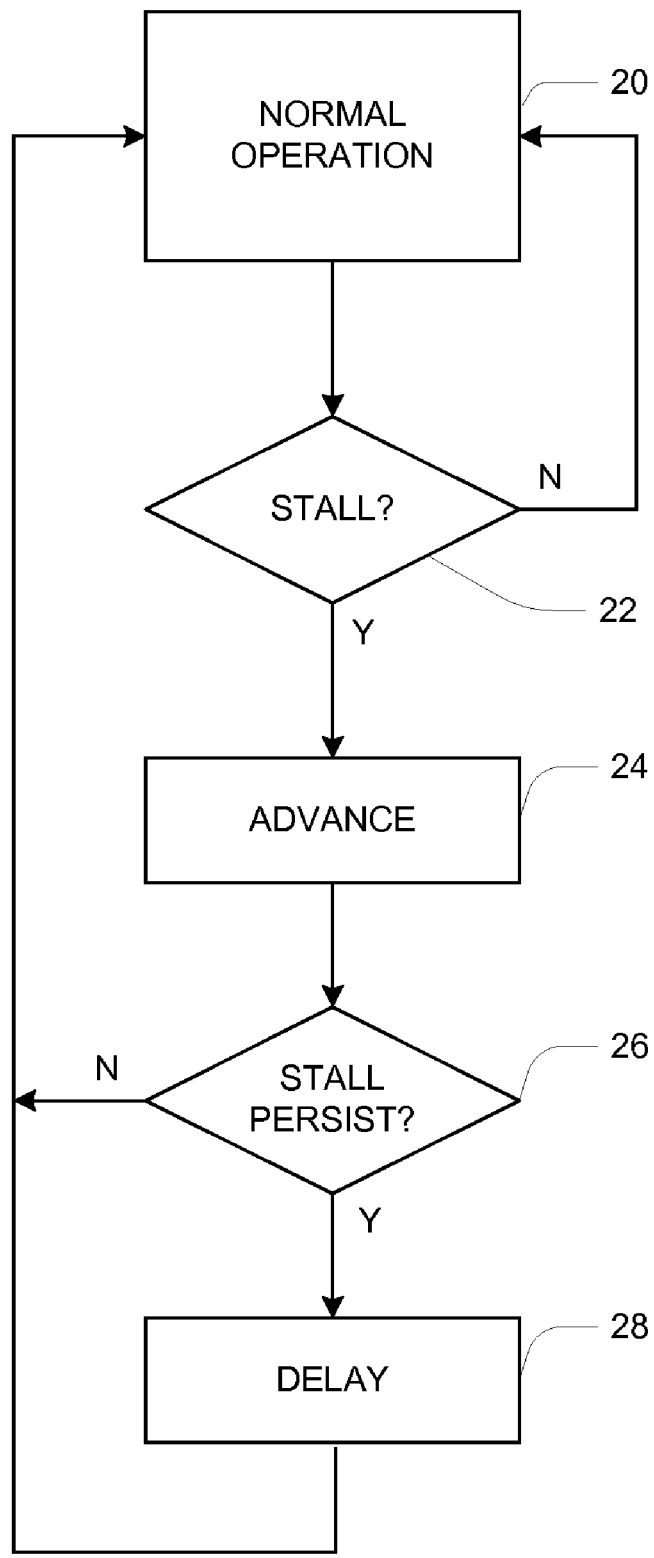
FIG. 7 is a flowchart of a compensation process which utilizes both the advance and delay operations of FIGS. 4 and 6 respectively to overcome a stall caused by sensor misalignment.

FIG. 7 shows a process that can be utilized when the direction of misalignment of the Hall-effect sensors is unknown, which may be the case, for example, for normal manufacturing tolerances. Step 20 indicates operation in the normal operating mode such as illustrated by FIG. 2 and discussed above. At step 22 a motor stall condition is detected, causing the process to proceed to step 24 which is a momentary advance operation such as described above with reference to FIG. 4. At step 26 it is determined whether the stall condition persists. If not (i.e., the motor has resumed rotating), then the normal operating mode is resumed at 20. This operation might occur, for example, if the stall is due to sensor misalignment that causes delayed commutation such as shown in FIGS. 3 and 4. However, if the stall condition persists, then at step 28 a momentary delay operation such as described above with reference to FIG. 6 is performed. If the stall condition is due to sensor misalignment that causes early commutation such as shown in FIGS. 5 and 6, then the operation at step 28 may induce the motor 14 to resume rotating.

It will be appreciated that one alternative to the process of FIG. 7 is to simply reverse the order of the advance and delay steps 24 and 28, i.e., to first delay commutation and then, if the stall condition persists at step 26, advance it. One order or the other may be more beneficial depending on the characteristics of the motor system and any known tendency of the sensor misalignment. If in a majority of cases the sensor misalignment results in delayed commutation such as shown in FIGS. 3 and 4, then the order shown in FIG. 7 might be most effective. If in a majority of cases the sensor misalignment results in early commutation such as shown in FIGS. 5 and 6, then the opposite order (delay then advance) might be better to use. The order could be predetermined by the system design or it could be selectable either at manufacturing time or even by a user.

While various embodiments of the invention have been particularly shown and described, it will be understood by those skilled in the art that various changes in form and details may be made therein without departing from the spirit and scope of the invention as defined by the appended claims. As already mentioned, the order of using the advance and delay operations 24 and 28 may be varied in different embodiments. Additionally, although the present disclosure utilizes the example of three phase windings and three Hall-effect sensors, other configurations of phase windings and Hall-effect sensors may be employed in alternative embodiments. Other variations from the specifics of the disclosed embodiments may also be covered by the claims below.

What is claimed is:

1. A method of compensating for misalignment of Hall-effect sensors that generate sensor signals providing motor position information to control commutation of motor drive current through windings of a motor, comprising:

in a normal operating mode, (1) providing motor drive current to the windings based on the sensor signals such that pairs of the windings are driven in a normal commutation sequence corresponding to a sequence of states of the sensor signals, and (2) monitoring for occurrence of a motor stall condition, the monitoring of the motor stall condition including:

sensing a drive current through the windings, when the drive current is less than a predetermined threshold, outputting a detection signal having a first value to indicate that no motor stall condition exists, and when the drive current is greater than the predetermined threshold, outputting the detection signal having a second value to indicate that the motor stall condition exists, the second value being different than the first value; and upon detecting the motor stall condition with the sensor signals in a given state that in the normal operating mode results in driving the windings according to a corresponding given commutation state, (1) in a first driving step, momentarily driving the windings according to one of an advanced commutation state and a delayed commutation state each adjacent to the given commutation state in the normal commutation sequence, (2) determining whether the motor stall condition persists after the first driving step, and (3) if the stall condition persists after the first driving step then in a second driving step momentarily driving the windings according to the other of the advanced commutation state and the delayed commutation state.

2. A method according to claim 1 wherein in the first driving step the windings are driven according to the advanced commutation state, and in the second driving step the windings are driven according to the delayed commutation state.

3. A method according to claim 1 wherein in the first driving step the windings are driven according to the delayed commutation state, and in the second driving step the windings are driven according to the advanced commutation state.

4. A method according to claim 1, wherein momentarily driving the windings includes measuring the duration of the momentary driving of a commutation state adjacent to the given commutation state.

5. A method according to claim 4, wherein the duration of the momentary driving of a commutation state is a first duration time when the commutation state adjacent to the given commutation state is the advanced commutation state, and a second duration time, distinct from the first duration time, when the commutation state adjacent to the given commutation state is the delayed commutation state.

6. A method according to claim 1, further comprising:
establishing, as the predetermined threshold, a current amount which, when exceeded, is an abnormally high current driving current applied to the windings.

7. A motor system, comprising:
a motor including Hall-effect sensors that generate sensor signals providing motor position information; and
a motor controller coupled to the motor, the controller being operative to compensate for misalignment of the Hall-effect sensors in controlling commutation of motor drive current through windings of a motor by:
(A) in a normal operating mode, (1) providing motor drive current to the windings based on the sensor signals such that pairs of the windings are driven in a normal commutation sequence corresponding to a sequence of states of the sensor signals, and (2) monitoring for occurrence of a motor stall condition, the monitoring of the motor stall condition including:
sensing a drive current through the windings,
when the drive current is less than a predetermined threshold, outputting a detection signal having a first value to indicate that no motor stall condition exists, and
when the drive current is greater than the predetermined threshold, outputting the detection signal having a second value to indicate that the motor stall condition exists, the second value being different than the first value; and;
(B) upon detecting the motor stall condition with the sensor signals in a given state that in the normal operating mode results in driving the windings according to a corresponding given commutation state, (1) in a first driving step, momentarily driving the windings according to one of an advanced commutation state and a delayed commutation state each adjacent to the given commutation state in the normal commutation sequence, (2) determining whether the motor stall condition persists after the first driving step, and (3) if the stall condition persists after the first driving step then in a second driving step momentarily driving the windings according to the other of the advanced commutation state and the delayed commutation state.

8. A motor system according to claim 7 wherein in the first driving step the motor controller is operative to drive the windings according to the advanced commutation state, and in the second driving step the motor controller is operative to drive the windings according to the delayed commutation state.

9. A motor system according to claim 7 wherein in the first driving step the motor controller is operative to drive the windings according to the delayed commutation state, and in the second driving step the motor controller is operative to drive the windings according to the advanced commutation state.

10. A motor system according to claim 7, wherein momentarily driving the windings includes measuring the duration of the momentary driving of a commutation state adjacent to the given commutation state.

11. A motor system according to claim 10, wherein the duration of the momentary driving of a commutation state is a first duration time when the commutation state adjacent to the given commutation state is the advanced commutation state, and a second duration time, distinct from the first duration time, when the commutation state adjacent to the given commutation state is the delayed commutation state.

12. A motor system according to claim 7, wherein the motor controller is further constructed and arranged to:
establish, as the predetermined threshold, a current amount which, when exceeded, is an abnormally high current driving current applied to the windings.

* * * * *